United States Patent

Park

[11] Patent Number: 6,118,470
[45] Date of Patent: Sep. 12, 2000

[54] OPTICAL SCANNING SYSTEM

[75] Inventor: Sang-shin Park, Suwon, Rep. of Korea

[73] Assignee: Samsung Electronics Co., Ltd., Kyungki-Do, Rep. of Korea

[21] Appl. No.: 09/119,845

[22] Filed: Jul. 21, 1998

[30] Foreign Application Priority Data

Oct. 24, 1997 [KR] Rep. of Korea ............... 97-54868

[51] Int. Cl.⁷ ............................ H04N 1/21; H01J 3/14
[52] U.S. Cl. ................... 347/240; 347/248; 347/252
[58] Field of Search .................... 347/240, 250, 347/249, 248, 251, 252

[56] References Cited

U.S. PATENT DOCUMENTS

| | | | |
|---|---|---|---|
| 4,386,272 | 5/1983 | Check et al. | 347/74 |
| 5,117,243 | 5/1992 | Swanberg et al. | 347/254 |
| 5,138,339 | 8/1992 | Curry et al. | 347/240 |

FOREIGN PATENT DOCUMENTS 0467 076  2/1992  European Pat. Off. .
43 04 111  8/1993  Germany .

*Primary Examiner*—N. Le
*Assistant Examiner*—Lamson D. Nguyen
*Attorney, Agent, or Firm*—Sughrue, Mion, Zinn, Macpeak & Seas, PLLC

[57] ABSTRACT

An optical scanning system includes a light source for emitting light beams, a beam deflection unit for deflecting the light beams to sequentially land the light beams along a predetermined scan line, and a light source driving unit. The light source driving unit drives the light source so as to land the light beams on pixel points set at equal intervals along the scan line according to image information by controlling the emission intervals between the light beams and the exposure periods of the respective light beams. The light source driving unit also adjusts the size of spots formed on the pixel points by the light beams according to gray scale values included in the image information. Therefore, in the optical scanning system, gray scale information is expressed by forming the light beam spots of an adjusted size on the pixel points set at equal intervals along the scan line.

4 Claims, 2 Drawing Sheets

OPTICAL SCANNING SYSTEM

BACKGROUND OF THE INVENTION

1. Field of the Invention

The present invention relates to an optical scanning system, and more particularly, to an optical scanning system which allows spots of a light beam to land on a determined scan line at equal intervals.

2. Description of the Related Art

In an optical scanning system, non-linearity indicates that the spots of a light beam are formed on a scan line at irregular intervals. In the case where a light beam deflected by a rotary polygonal mirror of an optical scanner lands on a predetermined rectilinear scan line as spots, the distances between arbitrary positions on the scan line and the rotary center of the rotary polygonal mirror are different. Spots are formed on a rectilinear scan line at irregular intervals, by light beams sequentially reflected from the rotary polygonal mirror rotating at constant speed at constant angular intervals. As the spots move farther from the rotary polygonal mirror, on the basis of the spot formed on the scan line nearest the rotary polygonal mirror, the interval between the spots become wider. U.S. Pat. No. 5,117,243 discloses an optical scanning system for forming spots of a light beam on a rectilinear scan line at constant intervals.

The above optical scanning system controls the intervals of light beam emission having constant exposure time from a light source to form spots of the light beams on a scan line at equal intervals.

The optical scanning system controls a light beam for each pixel to maintain constant exposure time of the light beam, which makes it difficult to express the gray scale information with respect to a pixel.

SUMMARY OF THE INVENTION

To solve the above problems, it is an objective of the present invention to provide an optical scanning system by which spots of light beams can land on pixel points which lie on a scan line at constant distances, and gray scale information for each pixel can be expressed.

Accordingly, to achieve the above objective, an optical scanning system is provided which includes a light source for emitting light beams, a beam deflection unit for deflecting the light beams to sequentially land the light beams along a predetermined scan line, and a light source driving unit. The light source driving unit drives the light source to land the light beams on pixel points set at equal intervals along the scan line according to image information by controlling the emission intervals between the light beams and the exposure periods of the respective light beams. The light source driving unit also adjusts the size of spots formed on the pixel points by the light beams according to gray scale values included in the image information.

Preferably, the light source driving unit includes a look-up table having information on the emission intervals between light beams, which is required to sequentially land the light beams on the pixel points set at equal distances, as well as a frequency variable clock generator for generating a clock signal having a frequency corresponding to the emission interval information recorded on the look-up table. The light source driving unit also includes a data shifter for outputting image data of a pixel in synchronization with the clock signal, a pulse width modulator for driving the light source to emit light beams having exposure periods corresponding to the image data, and a clock frequency controller for controlling data transmission from the look-up table to the frequency variable clock generator.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE PREFERRED EMBODIMENTS

Figure 1:
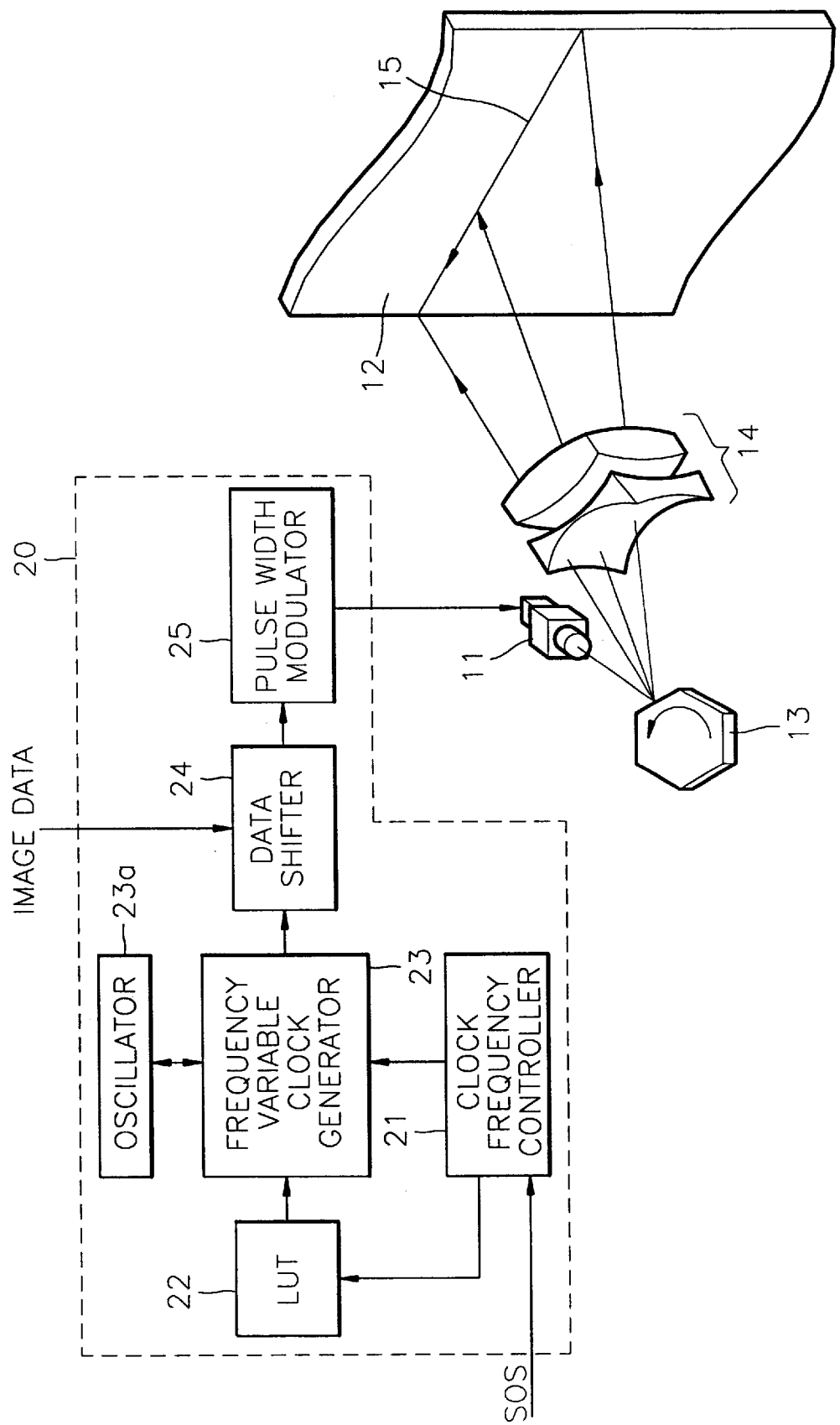
FIG. 1 illustrates an optical scanning system according to the present invention.

Referring to FIG. 1, an optical scanning system includes a beam deflection unit having a light source 11 for emitting a light beam in one direction, a rotary polygonal mirror 13 for deflecting light emitted from the light source to a scanned object surface 12, a lens unit 14 for focusing the deflected light beam on the scanned object surface, and a light source driving unit 20 for controlling the driving of the light source 11. For an optical scan system used in a printer, the scanned object surface 12 is a photosensitive drum or photosensitive belt acting as a photosensitive medium.

The rotary polygonal mirror 13 having a plurality of reflective sides, as the beam deflection unit, deflects a light beam incident on the reflective sides while being rotated by a driving device such as a motor (not shown) at a constant speed.

The lens unit 14 having at least one lens focuses a light beam reflected by the rotary polygonal mirror 13 to the scanned object surface 12.

The light source driving unit 20 controls the emission time of light beam from the light source 11 and the duration of the exposure, and is comprised of a clock frequency controller 21, a look-up table (LUT) 22, a frequency variable clock generator 23, a data shifter 24 and a pulse width modulator 25.

The look-up table 22 includes data of emission intervals of a light beam from the light source 11, so that the light beam reflected from the polygonal mirror 13 rotating at a constant speed lands so as to forms spots at a constant interval on the scan line 15.

The frequency variable clock generator 23 controls an oscillator 23a to output a clock signal having a frequency corresponding to the emission interval data provided by the look-up table 22.

The data shifter 24 synchronizes image data input from an external source with the clock signal input from the frequency variable clock generator 23 via its input port, and outputs pixel-unit image data by a pixel unit to the pulse width modulator 25. Here, each of the pixel-unit image data has gray scale information.

The pulse width modulator 25 substantially controls the on/off operation of the light source 11, and controls the width of a pulse for operating the light source 11 to emit a light beam for an exposure period corresponding to the gray scale information of each of the pixel-units in the received image data.

The clock frequency controller 21 receives a start-of-scan signal SOS from an external source, and then controls the look-up table 22 so that data of emission interval time of optical beam by a pixel-unit is sequentially output from the look-up table 22 into the frequency variable clock generator 23. Here, the SOS is generally generated by a photo detector (not shown) placed at a predetermined position for detecting a light beam deflected toward the scan line, in order to synchronize the start time of scanning for every one line scanning.

Figure 2:
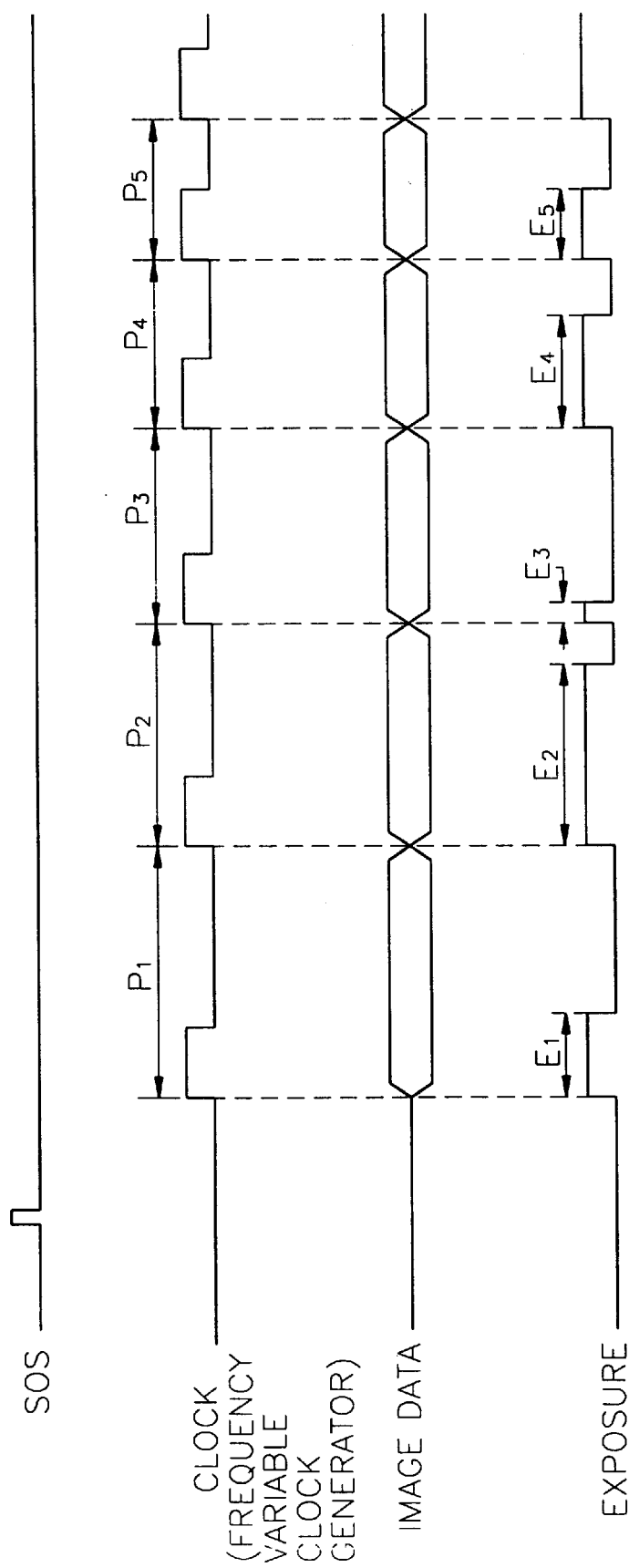
FIG. 2 is a timing chart with respect to some elements of the optical scan system of FIG. 1.

The operation of the optical scanning system will now be described referring to FIGS. 1 and 2.

After receiving the SOS, the clock frequency controller 21 controls the look-up table to allow the look-up table 22 to sequentially output the data on the emission interval time of the light beam by a pixel-unit to the frequency variable clock generator 23. Here, the data on the emission interval time of the light beam by a pixel-unit is set to land light beam spots on the pixel points determined to be at equal intervals along the scan line 15.

The frequency variable clock generator 23 reads data input from the look-up table and outputs a clock signal having a frequency corresponding to the data.

The data shifter 24 outputs image data received in synchronization with clock signals sequentially input at irregular frequencies, to the pulse width modulator 25 in pixel units.

The pulse width modulator 25 drives the light source 11 using a pulse having a width corresponding to the gray scale information included in the received image data per pixel. Consequently, the interval of generation of pulses of the pulse width modulator 25 are adjusted by the light beam emission interval times obtained from the look up table 22, thereby become the same as the interval of generation of clock signals output from the frequency variable clock generator (23). The width of a pulse corresponding to the time the light source 11 is driven is the same as the exposure time of the emitted light beam.

Under the control of the pulse width modulator 25, the light source 11 emits light beams at intervals $P_1$, $P_2$, $P_3$, $P_4$, and $P_5$ of generation of the clock signals from the frequency variable clock generator 23, which are adjusted to compensate for a difference in the light path from the light source 11 between the pixel points determined to be at equal distances on the scan line 15. Here, the light beam spots on the respective pixel points have different lengths by variable exposure periods $E_1$, $E_2$, $E_3$, $E_4$, and $E_5$ depending on the gray scale information. Therefore, the gray scale is expressed by the lengths of light beam spots on the pixel points according to the adjusted exposure periods.

According to the aforementioned operation of the optical scanning system, the spots of light beams land on the pixel points given at equal intervals along the scan line 15, and the lengths of spots formed on the pixel points in the direction of the scan line 15 vary according to the adjustment of the exposure period by the pulse width modulator 25.

As described above, the optical scanning system according to the present invention expresses gray scale per each pixel by forming light beam spots of an adjusted size on pixel points set at equal intervals along a scan line.

Although the invention has been described in terms of a preferred embodiment, it will be appreciated by those of ordinary skill in the art that various modifications may be made to the described embodiment without departing from the spirit and scope of the invention.

This application is based on Korean Patent Application 97-54868 which is incorporated by reference herein for all purposes.

What is claimed is:

1. An optical scanning system comprising:

a light source for emitting light beams a beam deflection unit for deflecting the light beams to sequentially land the light beams along a predetermined scan line; and a light source driving unit for driving the light source to land the light beams on pixel points set at equal intervals along the predetermined scan line according to image information by controlling emission intervals between the light beams and exposure periods of the respective light beams, and to adjust spot size of spots formed on the pixel points by the light beams according to gray scale values included in the image information.

2. The optical scanning system as claimed in claim 1, wherein the light source driving unit comprises:

a look-up table having information on the emission intervals between the light beams which is required to sequentially land the light beams on the pixel points set at equal intervals;

a frequency variable clock generator for generating a clock signal having a frequency corresponding to emission interval information recorded in the look-up table;

a data shifter for outputting image data of a pixel in synchronization with the clock signal, a pulse width modulator for driving the light source to emit the light beams having exposure periods corresponding to the image data; and a clock frequency controller for controlling data transmission from the look-up table to the frequency variable clock generator.

3. The optical scanning system as claimed in claim 1, wherein the beam deflection unit comprises:

a rotary polygonal mirror having a plurality of reflective sides for deflecting the light beams incident on its reflective sides by rotation; and a lens unit for focusing the light beams deflected by the rotary polygonal mirror on the predetermined scan line.

4. A light source driving unit for use in an optical scanning system which has a light source which emits light beams and a beam deflection unit for deflecting the light beams to sequentially land the light beams along a predetermined scan line, the light source driving unit comprising:

a look-up table having information on emission intervals between the light beams which is required to sequentially land the light beams on pixel points set at equal intervals along the predetermined scan line, a frequency variable clock generator for generating a clock signal having a frequency corresponding to the emission interval information recorded in the look-up table;

a data shifter for outputting image data of a pixel in synchronization with the clock signal;

a pulse width modulator for driving the light source to emit the light beams having exposure periods corresponding to the output image data; and a clock frequency controller for controlling transmission of data from the look-up table to the frequency variable clock generator;

wherein the light source driving unit drives the light source so as to land the light beams on said pixel points set at equal intervals along the predetermined scan line by controlling the emission intervals between successive ones of the light beams and the exposure periods of the respective light beams and adjusting spot size of spots formed on said pixel points by the light beams according to gray scale values included in image information.

* * * * *